UNITED STATES PATENT OFFICE.

JACOB W. DECASTRO, OF MAHWAH, NEW JERSEY.

TONIC BEVERAGE.

SPECIFICATION forming part of Letters Patent No. 256,129, dated April 11, 1882.

Application filed August 15, 1881. (No specimens.)

*To all whom it may concern:*

Be it known that I, JACOB W. DECASTRO, a citizen of the United States, residing at Mahwah, in the county of Bergen and State of New Jersey, have invented certain new and useful Improvements in Tonic Beverages; and I hereby declare the following to be a full, clear, and exact description of the same.

When milk in its natural state is charged with carbonic acid, or when beverages containing the same are so charged, the acid coagulates or otherwise injures the milk, the beverage in bottles or other vessels separates into two parts, there being a heavy curd on top and a watery liquid below, which will not be well reunited by ordinary shaking, the beverage when drawn from the bottle or other close vessel comes out almost entirely in the form of foam, and the beverage after having been kept some time, especially after having been cooled and allowed to become warm before again cooling, has an unpleasant taste.

The object of my invention is to produce milk beverages—such as milk-punch and gingermilk, as well as other beverages of which the vehicle is milk, either with or without medicinal ingredients—containing carbonic acid under pressure, which shall be free from objectionable features usually resulting from the mixture of an acid with milk, shall keep in good condition for a long time, and be palatable, refreshing, and wholesome.

It has been sought to prevent injury to the milk from the acid by putting into the milk salts of the alkaline earths, such as carbonate of potash or bicarbonate of soda; but this is manifestly objectionable in a beverage intended to be pure and free from any chemicals or extraneous matter. When medicinal agents are added these are incorporated for their specific and well-known effects in a definite quantity and for a definite purpose, the beverage merely acting as an agreeable and wholesome vehicle, or as an adjuvant.

Having ascertained, then, that milk in its natural state is not satisfactory for use in making carbonic acid-charged milk beverages, my invention consists in overcoming the difficulties above stated by substituting condensed milk for the natural milk in milk beverages to be charged with carbonic acid. To the condensed milk are added saccharine matter, a suitable spirituous, vinous, or other liquor, (rum, brandy, whisky, &c., malt, &c.,) or an essence, (ginger, &c.,) of the proper kind to give the desired character to the beverage, and to this mixture is added water charged with carbonic acid, after which the beverage is bottled and securely corked; or the liquid in quantities may be charged directly with carbonic acid.

If desired, medicinal as well as nutritious tonic and palatable or flavoring properties may be imparted to the beverage by adding the salts of quinine, iron, &c., or coca, or such other drug or drugs or substance as the existing circumstances may demand, either by mixing the same with the basic ingredients or with the aerated water.

By employing condensed milk I use milk in its most nutritious form, and it is probably owing to its density, resulting from the loss by evaporation of the water and some of the whey, and to a probable change in the albumen by the heat employed in its evaporation, that the objectionable foaming is entirely prevented, while also, most likely by the loss of butyric ether, consequent to the vaporization in its production, and of other objectionable substances, elements of decomposition or having an unpleasant odor, or an odor not belonging to the beverage, are removed. Furthermore, when there is any separation of the clear from the denser constituents, simple shaking of the bottle or other vessel recombines them.

I do not allege that there will be no separation in my beverage when the bottle stands, but that if any separation takes place but slight agitation will reunite the constituents of the beverage and make an elegant mixture, for there is this difference between my completed beverage and any ordinary milk beverage charged with carbonic-acid gas: In my beverage the rich condensed milk, like cream, is suspended in the mixed aqueous and spirituous or vinous liquids, and being lighter than these, when the mixture is left at rest the light and rich condensed milk rises to the top, but unchanged, slight agitation reuniting it with the other ingredients to form an elegant mixture. When ordinary milk is used, on the contrary, the carbonic acid breaks up the milk, causing a separation of the whey from the curd, which also rises to the top, but sour, and cannot be reunited with the whey and other constituents by agitation.

The ingredients are mixed in the proper proportions to make a milk-punch, as well known in the art, or in the proper proportions for other beverages, according to taste or according to the effect desired, the condensed milk being used in the proportion in which it is generally used as regards ordinary milk, and being either diluted with water first or mixed at once with the other ingredients.

What I claim is—

1. The process of manufacturing an aerated beverage of milk or containing milk which shall keep for a long time, which shall be free from odors foreign to the beverage, which shall not permanently separate, and which shall be free from objectionable foaming, when drawn, by supplying the milk in the form of condensed milk, and then charging with carbonic acid and keeping under pressure, substantially as described.

2. The process of making an aerated self-preservative tonic beverage by mixing together a suitable spirituous, vinous, or other alcoholic liquor or essence, saccharine matter, and condensed milk, and charging the same with carbonic acid, under pressure, whereby, the milk being supplied in the form of condensed milk, the usual and objectionable effects of carbonic acid upon milk are obviated, as set forth.

3. An aerated and self-preservative tonic beverage consisting of non-alkaline water, a suitable spirituous, vinous, or other alcoholic liquor or essence, saccharine matter, and condensed milk, the beverage containing carbonic acid being under pressure, the condensed milk being substituted for ordinary milk to obviate the objectionable effects of carbonic acid upon ordinary milk when the two are kept together for more than a very short time, and the ingredients being in suitable proportions, as described.

JACOB W. DECASTRO.

In presence of—
MARTIN E. WALDSTEIN,
ADOLPHUS MILLAUS.